United States Patent
Vankamamidi et al.

(10) Patent No.: US 9,696,919 B1
(45) Date of Patent: Jul. 4, 2017

(54) SOURCE/COPY REFERENCE TRACKING WITH BLOCK POINTER SETS

(71) Applicant: EMC Corporation, Hopkinton, MA (US)

(72) Inventors: Vamsi Vankamamidi, Shrewsbury, MA (US); David W. Harvey, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 261 days.

(21) Appl. No.: 14/674,608

(22) Filed: Mar. 31, 2015

(51) Int. Cl.
G06F 3/06 (2006.01)

(52) U.S. Cl.
CPC ............ G06F 3/0619 (2013.01); G06F 3/065 (2013.01); G06F 3/067 (2013.01)

(58) Field of Classification Search
CPC ......... G06F 3/0619; G06F 3/065; G06F 3/067
See application file for complete search history.

(56) References Cited

U.S. PATENT DOCUMENTS

| | | | |
|---|---|---|---|
| 7,555,504 B2 | 6/2009 | Bixby et al. | |
| 8,032,498 B1 | 10/2011 | Armangau et al. | |
| 8,412,688 B1 | 4/2013 | Armangau et al. | |
| 2010/0077013 A1* | 3/2010 | Clements | G06F 17/30156 707/822 |
| 2011/0161381 A1* | 6/2011 | Wang | G06F 17/30088 707/814 |

* cited by examiner

Primary Examiner — Reginald Bragdon
Assistant Examiner — Edward Wang
(74) Attorney, Agent, or Firm — BainwoodHuang (57) ABSTRACT

A technique for managing file systems that support block sharing places a source/copy attribute in each block pointer. The source/copy attribute identifies the respective block pointer as either a source-block pointer or a copy-block pointer. A reference count on each data block maintains a count of the number of source-block pointers pointing to the data block but excludes the number of copy-block pointers pointing to the data block. Block pointers are arranged in block pointer sets (BPSs), and sharing relationships are formed among BPSs and copies of BPSs. The sharing relationships generally keep most block sharing information at the BPS level, with reference counts on data blocks tracking only the number of source-block pointers, which is typically small, often being equal to one.

20 Claims, 7 Drawing Sheets

910 — In response to receiving a request to write data to a file, (i) allocate a data block from an address within an address space of the file system, (ii) provide a first BPS (Block Pointer Set) including a first block pointer, the first block pointer storing the address of the data block and having a source/copy attribute that identifies the first block pointer as a source-block pointer, (iii) write the data to the data block, and (iv) set a reference count for the data block to indicate a single reference 912 — In response to receiving a request to create a logical copy of the data, (i) provide a second BPS including a second block pointer, the second block pointer storing the address of the data block and having a source/copy attribute that identifies the second block pointer as a copy-block pointer, and (ii) update file system metadata to establish a sharing relationship between the first BPS and the second BPS 914 — Create the logical copy of the data without changing the reference count for the data block, the reference count for the data block reflecting a number of source-block pointers that point to the data block and being independent of a number of copy-block pointers that point to the data block

SOURCE/COPY REFERENCE TRACKING WITH BLOCK POINTER SETS

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly employ file systems for serving files and directories to hosts and/or for internal data management. A file system may represent a file using an inode (index node), which has a unique inode number within the file system and includes pointers to data blocks that store file data. The data blocks are units of storage, which may be 8 KB in size, for example; however, different file systems may use different data block sizes and some file systems may use multiple data block sizes. The inode may include pointers to indirect blocks (IDBs), i.e., blocks which themselves store arrays of pointers. The pointers may point to data blocks or to other IDBs. IDBs may be arranged in trees, with a pointer in one IDB pointing to another IDB, ultimately terminating in a leaf IDB that points to data blocks. The use of IDB trees allows files to grow to very large sizes.

Many file systems support block sharing, i.e., arrangements of metadata that allow multiple objects to point to some or all of the same data blocks. Block sharing avoids having to create redundant copies of the same blocks when those blocks are shared among multiple files. In some examples, files that share blocks in a data storage system are snapshots that provide point-in-time versions of files, and/or clones that provide multiple versions of the same file, e.g., for deployment of a golden image.

A common task performed by file systems that support block sharing is to keep track of numbers of objects that reference data blocks. For example, when a file system performs an operation to delete a data block referenced by an object, the file system must have some way of determining whether any other object is also referencing the data block, so that the file system avoids deleting data that another object relies upon.

Many approaches have been used to track block sharing. One approach stores a field in each block pointer (i.e., in each pointer in an inode or IDB) that indicates whether the block pointer is an owner or a non-owner of the data block. If a file system attempts to delete a non-owner block pointer (e.g., as part of deleting a file or a portion of a file), the file system may delete the block pointer but leave the data block it points to in place. However, if the file system attempts to delete an owner block pointer, the file system first checks for any non-owners. If a non-owner is found, the file system may delete the owner block pointer and transfer its ownership to the non-owner block pointer, making it the owner and, again, leaving the pointed-to data block in place. If no non-owner is found, the file system may delete the owner block pointer and free the data block, e.g., by marking it as available to be allocated elsewhere.

Another approach used to track block sharing is to employ integer reference counts. With this approach, a file system stores a reference count for each data block. The reference count for a data block counts the number of block pointers that point to that data block. When a new block pointer is made to point to a data block, the reference count of that data block is incremented by one. When a block pointer pointing to the data block is deleted or pointed elsewhere, the reference count of the data block is decremented by one. If the reference count falls to zero, there are no remaining references and the data block may be freed.

Yet another approach used to track block sharing employs weighted reference counts. Here, each block pointer separately records a number of shares it has in a data block to which it points. Whenever a data block is shared from a new pointer, the number of shares is distributed between the pointers.

SUMMARY

Prior approaches to tracking references on data blocks may involve drawbacks. For example, owner/non-owner schemes presume that there is only a single owner of a data block. However, requiring a single owner can be burdensome to administer in a data storage system. Also, requiring a single owner can mask the fact that multiple files or other objects can each be owners of the data block in their own right, i.e., with no hierarchical relationship between or among them.

Integer reference counting schemes are simple in principle but can be inefficient to administer. For instance, a file system may store the reference counts of data blocks in respective per-block metadata. If an IDB points to 512 data blocks and is deleted, the file system may need to visit per-block metadata for 512 different blocks to decrement their respective reference counts. The per-block metadata for these 512 blocks may be located in diverse regions of the file system and may require up to 512 disk operations to access. Similarly large numbers of disk accesses may be required for incrementing reference counts when new IDBs are created.

Weighted reference counting schemes address the issue of distributed disk accesses by vesting the referencing counting metadata in block pointers, rather than in metadata for pointed-to blocks. However, the reference counting metadata may require a non-trivial number of bits to store large numbers of shares (e.g., 500 or 1000). Also, on the rare occasion that references are divided many times, one may arrive at a reference value of 1, which cannot be further divided, at least not without additional processing.

In contrast with these prior approaches, an improved technique for managing file systems that support block sharing places a source/copy attribute in each block pointer that identifies the respective block pointer as either a source-block pointer or a copy-block pointer. A reference count on each data block maintains a count of the number of source-block pointers pointing to the data block but excludes the number of copy-block pointers pointing to the data block. Block pointers are arranged in block pointer sets (BPSs), and sharing relationships are formed among BPSs and copies of BPSs. The sharing relationships generally keep most block sharing information at the BPS level, with reference counts on data blocks tracking only the number of source-block pointers, which is typically small, often being equal to one.

Advantageously, the improved technique greatly reduces the need to update reference counts on data blocks when copies are made or deleted. As compared with weighted reference counts, which require multiple bits in each block pointer, the source/copy attribute may be implemented with a single bit, thus making block pointer bits available for other uses. Because data block reference counts count only the number of source-block pointers, their values are typically small, enabling a great many objects to share a data block with a given amount of per-block metadata.

Certain embodiments are directed to a method of managing data storage in a file system that supports block sharing. The method includes, in response to receiving a request to write data to a file, (i) allocating a data block from an address within an address space of the file system, (ii) providing a first BPS (Block Pointer Set) including a first block pointer, the first block pointer storing the address of the data block and having a source/copy attribute that identifies the first block pointer as a source-block pointer, (iii) writing the data to the data block, and (iv) setting a reference count for the data block to indicate a single reference. In response to receiving a request to create a logical copy of the data, the method further includes (i) providing a second BPS including a second block pointer, the second block pointer storing the address of the data block and having a source/copy attribute that identifies the second block pointer as a copy-block pointer, and (ii) updating file system metadata to establish a sharing relationship between the first BPS and the second BPS. Creating the logical copy of the data does not accompany a change in the reference count for the data block, the reference count for the data block reflecting a number of source-block pointers that point to the data block and being independent of a number of copy-block pointers that point to the data block.

Other embodiments are directed to a data storage system constructed and arranged to perform a method of managing data storage in a file system that supports block sharing, such as the method described above. Still other embodiments are directed to a computer program product. The computer program product stores instructions which, when executed on one or more processing units, cause the processing units to perform a method of managing data storage in a file system that supports block sharing, such as the method described above.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing file systems that support block sharing places a source/copy attribute in each block pointer that identifies the respective block pointer as either a source-block pointer or a copy-block pointer. A reference count on each data block maintains a count of the number of source-block pointers pointing to the data block but excludes the number of copy-block pointers pointing to the data block. Block pointers are arranged in block pointer sets (BPSs), and sharing relationships are formed among BPSs and copies of BPSs.

The following definitions are provided to assist the reader by providing interpretations of terms that may be used to describe features of embodiments hereof. These definitions are not intended to be limiting but rather are provided for convenient reference to convey how example embodiments hereof may be practiced.

DEFINITIONS

Block Pointer: A pointer in an inode or indirect block (IDB) of a file that points (i) to a lower-level IDB in an IDB tree of the file or (ii) to a data block. The data block has a physical address in a file system and may represent a smallest unit of allocatable storage, e.g., 8 KB. In some examples, leaf IDBs may point to VBMs (Virtual Block Maps), which virtualize physical block locations.

Write Split: An activity performed when multiple related files share a data block, where one of the files acts to change its version of the shared data block to something new. To effect the change for that file, while preserving the data block for the other file(s), the file system allocates a new data block to that file to store the changed content. The file system also allocates a new IDB, and the block pointers in the original IDB are copied into the newly allocated IDB. Initially, all of the block pointers in the new IDB point to the same data blocks as did the original, except for the block pointer that points to the newly allocated data block. Where IDBs for a file are arranged in an IDB tree, each node of the IDB tree between the inode for the file and the newly allocated block is similarly split, with its block pointers copied from the original respective IDB, except for those that point to newly allocated blocks.

Snap: A point-in-time version of a file. Each snap has its own inode, but multiple snaps of the same file generally share many of the same IDBs and data blocks. The term is also used as a verb, as in to create a snap.

Fast Copy: A logical copy that involves copying block pointers rather than copying underlying data blocks.

Fast Move: A logical move that involves moving block pointers rather than moving underlying data blocks.

FSBN: File system block number. Used to identify addresses of blocks in a physical address space of a file system. File systems may have physical address spaces with FSBNs ranging from zero to a large number.

Block Pointer Set (BPS): A set of one or more block pointers covering a range of logical addresses of a file at a single level of an IDB tree. When creating duplicate block pointers in response to Write Splits, the file system duplicates each BPS as a unit. Multiple BPSs may be arranged in a Family. Each BPS in a Family has a set of links pointing to at least one other Family member to enable all Family members to be identified. Typically, all block pointers that make up a BPS are located within a single IDB, and each IDB may include multiple BPSs.

Family: A set of BPSs related by Parent/Child relationships induced by snaps or fast copies, for example. A Family consists of a Parent and each of its Children; however, some Families may have no Children or the Parent may be deleted. A Family, as used herein, does not include grandchildren or grandparents.

Parent: An attribute of a Block Pointer Set (BPS) indicating an originating position within a Family. A Parent BPS may have any number of Child BPSs, including zero, where Child BPSs may be created via Snap or Fast Copy, for example. A Parent BPS may itself be a Child BPS of another Parent BPS.

Child: An attribute of a Block Pointer Set (BPS) indicating a later-arising position within a Family. A Child BPS is created by copying its preexisting Parent BPS, e.g., in response to a Write Split or Fast Copy. Each Child has exactly one Parent but may have any number of Siblings that share the same Parent, including zero.

Oldest Child: The first Child BPS created by copying a Parent BPS.

Sibling: A Child BPS that shares a Parent BPS with at least one other Child BPS.

Per-BPS Data Structure: A data structure for a particular BPS that captures relationships among a set of BPSs in the same Family. In an example, a BPS Data Structure includes:

Children: Number of Child BPSs in the Family. This field may be provided as an optimization in some examples but omitted from others, as the information it supplies may also be acquired by traversing Sibling links.

Parent BPS Link: A pointer to the Parent BPS in that Family. In some examples, only the Oldest Child has a populated Parent BPS Link.

Child BPS Link: A pointer to a head of a doubly-linked list of all Child BPSs in a Family. In an example, the head of the linked list is the last Child BPS that was created.

Forward Sibling BPS Link: A pointer to a next Sibling BPS in the doubly-linked list.

Backward Sibling BPS Link: A pointer to a previous BPS in the doubly-linked list.

Source: An attribute of a Block Pointer that identifies the block pointer as being the first block pointer in its Family that points to a particular data block. Whenever a new block is allocated, the Block Pointer pointing to the new block is made to be a Source and is marked Private.

Copy: An attribute of a Block Pointer that identifies the block pointer has having been copied, i.e., from another Copy or from a Source, e.g., as part of performing a Write Split or Fast Copy. A Copy is identical (for all intents and purposes herein) to the Block Pointer from which it was copied. A Copy can be promoted to a Source if the block it points to is changed to a newly allocated block. Block Pointers in a newly created Child BPS are all Copies, except for the block pointer that points to the newly allocated block, which is a Source. If multiple block pointers in a Child BPS are made to point to newly allocated blocks, then each such block pointer is made a Source. In an example, when deleting a Source block pointer, each Copy of the Source itself becomes a Source. Alternatively, one Copy could be made a new Source with the rest kept as Copies, but doing so might involve additional overhead.

S/C: A field in a Block Pointer that identifies the Block Pointer as a Source or a Copy. May be provided as a single bit.

Private: An attribute of a Source block pointer, which identifies the Source as having no Copies. Provided as an optimization to avoid the need to search for Copies within a Family when performing certain operations, such as deleting a Source. A newly-created Source block pointer is initially Private and is changed to Unknown when a copy is made (e.g., when a Child is created).

Unknown: An attribute of a Source block pointer, which indicates that the Source might or might not have any Copies.

U/P: A field in a Block Pointer that indicates whether the Block Pointer is Unknown or Private. May be implemented as a single bit and is meaningful only for Sources.

Reference Count: A count of the number of Sources pointing to a block. Copies do not count toward the Reference Count for a block, only Sources. A Reference Count is not limited in scope to a particular Family, but rather extends across families and includes the entire file system. When a new block is first allocated to a file, its Reference Count is set to one.

Figure 1:
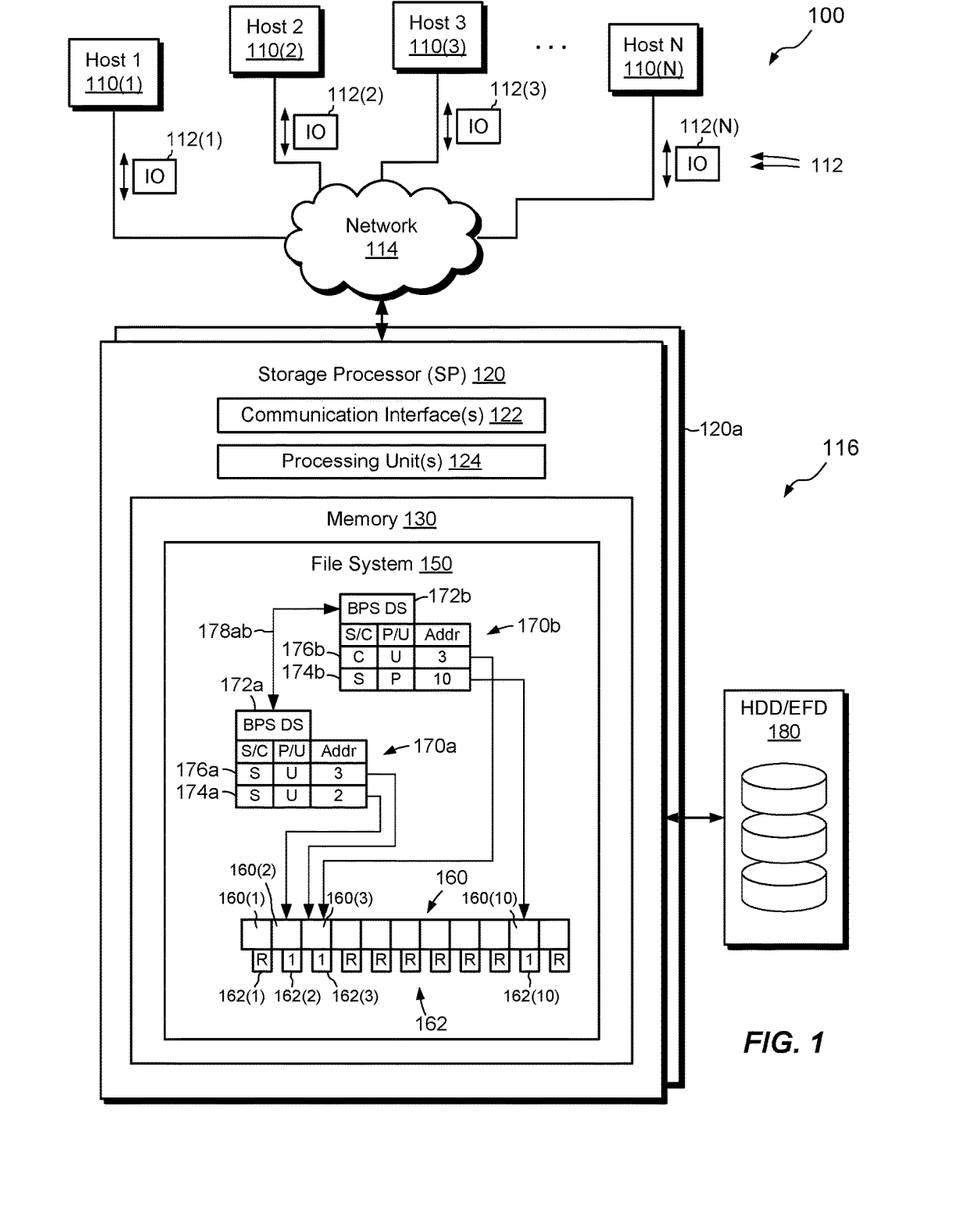
FIG. 1 is block diagram showing an example environment in which embodiments of the invention hereof can be practiced.

With these example definitions in place, we now proceed to FIG. 1, which shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of hard disk drives and/or electronic flash drives. The data storage system 116 may include multiple SPs like the SP 120 (see, for example, a second SP 120a). For instance, multiple SPs may be provided as circuit board assemblies, or "blades," which plug into a chassis that encloses and cools the SPs. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) may connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180.

The SP 120 is seen to include one or more communication interfaces 122, a set of processing units 124, and memory 130. The communication interfaces 122 include, for example, adapters such as SCSI target adapters and network interface adapters for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

To perform operations on file systems, the SP 120 may be configured further to respond to IO requests 112(1-N) by creating files, deleting files, copying files or portions thereof, moving files or portions thereof, and taking snaps and/or clones of files. Such file system operations may act upon host-accessible file systems and/or upon internal file systems, e.g., those provided to perform internal data management within the data storage system 116.

The memory 130 includes a file system 150. The file system 150 has data blocks 160 for storing data of the file system 150. In an example, the data blocks 160 are 8 KB storage extents; however, the data blocks 160 may be of any size and may be provided in multiple sizes in some implementations. The data blocks 160 each have an address within a physical address space of the file system 150. In an example, the address of each data block is designated by a file system block number, or FSBN. Although FIG. 1 shows the file system 150 within the memory 130, where the file system 150 is managed, it should be understood that persistent structures of the file system 150 may alternatively reside within the storage 180.

Each of the data blocks 160 is seen to have an associated reference count 162. For example, data blocks 160(2), 160(3), and 160(10) have associated reference counts 162(2), 162(3), and 162(10), respectively. According to embodiments hereof, each of the reference counts 160 indicates a number of source-block pointers that reference (e.g., point to) the respective data block. In an example, the reference count for each data block is stored in per-block metadata for that data block, which the file system 150 may maintain in another location (not shown) in the physical address space of the file system 150.

The file system 150 is further seen to include a first BPS (Block Pointer Set) 170a and a second BPS 170b. In the example shown, each BPS includes two block pointers, i.e. 174a and 176a for the first BPS 170a and 174b and 176b for the second BPS 170b. It should be understood, however, that the BPSs 170a and 170b may include any number of block pointers, including a single one. In an example, the file system 150 supports a large number of BPSs of uniform size. In some examples, as will be described, BPSs are stored as logical structures within IDBs, with each such IDB including an integer number of BPSs, which, in some embodiments, may include a single BPS that spans the entire IDB.

In this example, each block pointer within each BPS is seen to include an S/C field, a U/P field, and a block address. The block address specifies an FSBN in the physical address space of the file system 150, which points to a particular data block located at that FSBN. For example, the address pointed to by block pointer 174a is 2, which identifies data block 160(2) at FSBN 2 (the FSBNs are chosen to be small for ease of illustration).

The S/C field for a block pointer indicates whether that block pointer is a source-block pointer or a copy-block pointer. In general, and although not required, a source-block pointer gets its source status by being the first block pointer in its family to point to a data block after the data block has been allocated, i.e., after the file system 150 has made the block available for use. Also, in general, a copy-block pointer gets its copy status by being a copy of another block pointer. The other block pointer may itself have been a source-block pointer or a copy-block pointer. Although not required, the S/C field may be realized in each block pointer with a single bit, e.g., using "1" for source and "0" for copy.

The U/P field for a block pointer indicates whether that block pointer has an "unknown" status (U) or a "private" status (P). In an example, the U/P field is meaningful only for source-block pointers, as it indicates whether the source block pointer has ever been copied to create a copy-block pointer. When the file system 150 first allocates a data block, the file system 150 may assign the first block pointer that points to the data block to be a source-block pointer and may mark the source-block pointer as private. Upon a subsequent copy, the file system 150 may change the U/P status to unknown. Although not required, the U/P field may be realized in each block pointer with a single bit, e.g., "1" for private and "0" for unknown. As will become evident, the U/P field may be provided as an optimization to promote efficiency for particular file system activities and may be omitted in certain embodiments.

In an example, each BPS has a respective per-BPS data structure. For example, the first BPS 170a has a per-BPS data structure 172a and the second BPS 170b has a per-BPS data structure 172b. Each per-BPS data structure 172 points to one or more other BPS data structures provided for other BPSs in the same family. For example, the first BPS 170a and the second BPS 170b point to each other via link 178ab.

In general, two BPSs are in the same family if one of them was created as a copy of the other. Original BPSs may be regarded as parent BPSs and copies of originals may be regarded as child BPSs. Child BPSs can themselves become parent BPSs, e.g., for copies made of copies, and may start their own families. The per-BPS data structures thus store family relationships in a distributed manner, where BPSs in the same family have a block-sharing relationship deriving from copies made of block pointers when creating child BPSs from a parent BPS. Each family can have only a single parent BPS but may have any number of child BPSs.

In an example, the per-BPS data structures 172a and 172b are stored in file system metadata maintained separately from the BPSs they describe, and the locations of per-BPS data structures may be identified, for example, by calculation. In some examples, the file system 150 may store BPS data structures 172 all together in a common space within the file system 150, although this is not required.

In the example of FIG. 1, the second BPS 170b has been created as a child BPS of the first BPS 170a. For illustrative purposes, it is assumed now that the second BPS 170b was created as a result of a write split. For example, it is assumed that two files (not shown) shared data block 162(2) through the first BPS 170a when one of the files acted to change its version of the data stored in block 162(2). To preserve the data in block 162(2) for the other file, the file system 150 allocated a new data block, e.g., 162(10), and copied the first BPS 170a to create the second BPS 170b, e.g., by copying all of the block pointers in the first BPS to the second BPS. As block pointer 174a pointed to the block to be changed, 160(2), block pointer 174b in the second BPS 170b was made to point to the newly allocated block, 160(10). Block pointers in the first BPS 170a remained unchanged, except perhaps that the U/P status of copied block pointer 174a may have been changed from private to unknown (e.g., if the status was previously private). The S/C status of block pointer 174b was set to source, and its U/P status was set to private. The S/C status of the copied block pointer 176b was set to copy.

As a result of this write split operation, the only data block whose reference count has changed is block 160(10), i.e., to reflect that fact that a single source 174b now points to it. No change was made to reference count 162(3), even though an additional block pointer now points to it. Rather, the BPS data structures 172a and 172b maintain the sharing relationship.

Alternatively, the file system 150 may have provided the second BPS 170b as a result of a fast copy operation. For instance, it is now assumed that the file system 150 acted to create a logical copy of the data pointed to by the block pointers 174a and 176a. The copy was "logical" because it was effected by changing metadata, rather than by creating a copy of the underlying data blocks. The logical copy may have been from one file to another or from one region of a file to another region of the same file. The second BPS 170b may have been pre-existing, or it may have been created to effect the logical copy. In any case, the pointers 174a and 176a were copied into corresponding locations of the second BPS 170b. Initially, both copied pointers 174b and 176b had copy status, although, as shown here, pointer 174b was later changed to point to a newly allocated block 160(10), such that its S/C status was changed to source and its U/P status to private.

No reference counts were changed as a result of the fast copy operation. The only reference count seen to change is 162(10), but that change reflects a later allocation. No change was made to reference count 162(3), even though an additional block pointer now points to it. Again, the BPS data structures 172a and 172b maintain the sharing relationship.

Figure 2:
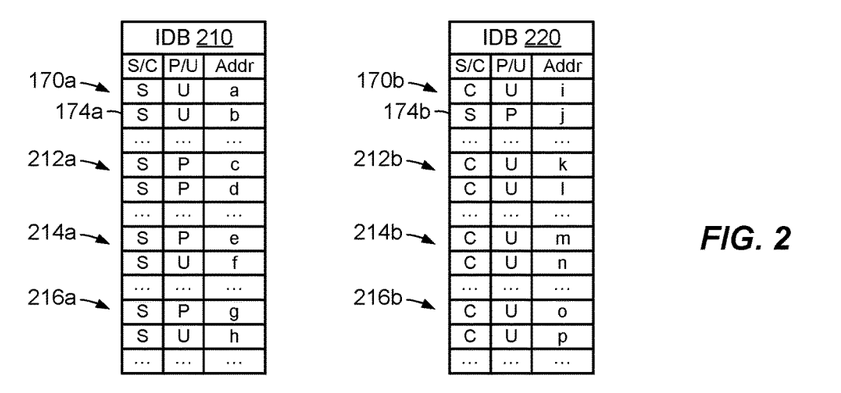
FIG. 2 is a diagram showing example first and second block pointer sets (BPSs) provided in respective indirect blocks (IDBs) of a file system, where the second BPS is a child of the first BPS.

FIG. 2 shows an example arrangement of BPSs within indirect blocks (IDBs). Here, the first BPS 170a is seen to be found within a first IDB 210 and the second BPS 170b is seen to be found within a second IDB 220. IDB 210 further includes additional BPSs 212a, 214a, and 216a, while IDB 220 further includes additional BPSs 212b, 214b, and 216b. The ellipses shown below each BPS are intended to indicate that each BPS may include greater than two block pointers. The optimal number of block pointers per BPS may depend on many factors, but numbers in the range of hundreds may be expected. Block addresses in IDB 210 are shown with letters a-h, while block addresses in IDB 220 are shown with letters i-k. It is not intended that the addresses shown must be different from one another by virtue of being represented by different letters, i.e., addresses indicated by different letters may be the same or they may be different.

In the usual manner, each of the IDBs 210 and 220 provides a mapping between a range of logical addresses of a file and a corresponding range of physical address of blocks allocated to that logical range. In an example, IDB 210 and IDB 220 belong to respective files or to respective ranges of logical addresses of the same file.

In an example, when creating a child BPS in response to a write split, the file system 150 copies the entire IDB in which the parent BPS is located. Thus, for example, when the file system 150 created BPS 170b in response to a write split on block 160(2) (FIG. 1), the file system 150 allocated a new IDB 220 and copied all the block pointers in IDB 210 to IDB 220, modifying S/C fields and U/P fields as necessary to indicate the copies.

Figure 3:
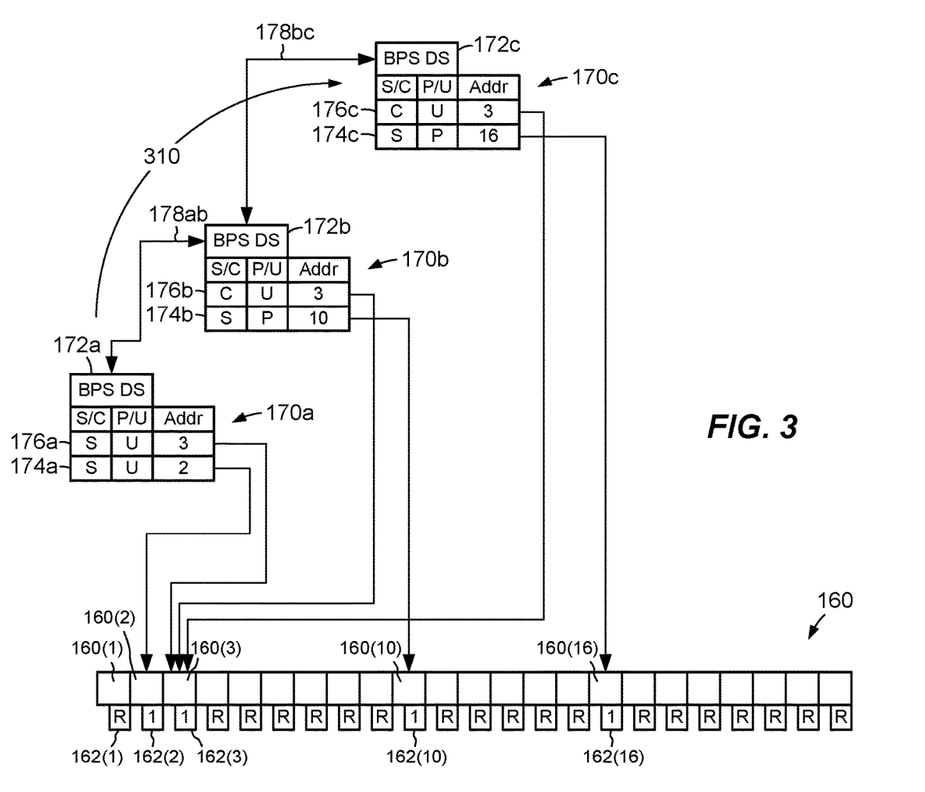
FIG. 3 is a block diagram showing an example arrangement for providing a third BPS as another child of the first BPS.

FIG. 3 shows an extension of the arrangement shown in FIG. 1, which includes a third BPS 170c. Here, as indicated by arrow 310, the third BPS 170c has been provided as a second child BPS of parent BPS 170a. Block pointers 174a and 176a have been copied to corresponding positions of 174c and 176c, and S/C field 176c has been set to copy. If BPS 170c was created in response to a write split, e.g., on block 160(2), then pointer 176c points to a newly allocated data block 160(16). The file system 150 sets the S/C field of pointer 174c to source and the U/P field to private. The newly allocated block 160(16) receives a reference count 162(16) of one. If BPS 170c was instead provided in response to a fast copy, then S/C fields of pointers 174c and 176c would have both been set to copy (with 174c later set to source when pointing to newly allocated block 160(16)). The newly allocated block 160(16) would have received a reference count 162(16) of one.

Even though block 160(3) now has three block pointers 176a, 176b, and 176c pointing to it, its reference count 162(3) remains unchanged as there is still only one source-block pointer 176a pointing to it.

A per-BPS data structure 172c establishes a sharing relationship, via link 178bc, with BPS 170b (i.e., between siblings) and, transitively, via link 178ab, with BPS 170a (i.e., between parent and child). The sharing relationship established by the per-BPS data structures 172 effectively shares the single reference count across the source 176a and all of its copies 176b and 176c.

Figure 4:
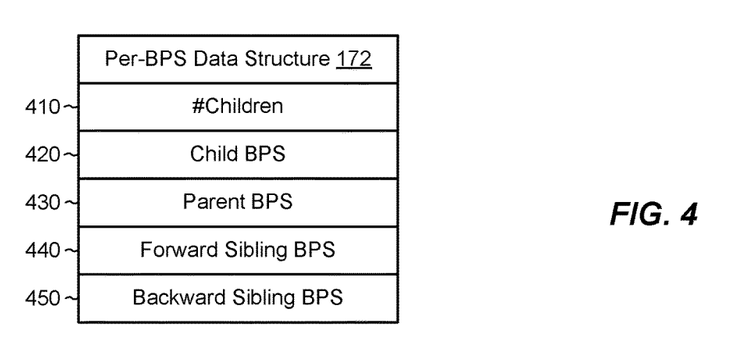
FIG. 4 is a diagram showing an example per-BPS data structure and example fields provided with the per-BPS data structure.

FIG. 4 shows an example implementation of a per-BPS data structure 172, which may be representative of per-BPS data structures 172a, 172b, and 172c. Here, per-BPS data structure 172 is seen to include the following fields:

Children 410: Number of Child BPSs in the family. In the example of FIG. 3, the value of this field for per-BPS data structure 172a is two.

Child BPS Link 420: A pointer to a head of a doubly-linked list of all child BPSs in a family. In an example, the head of the linked list is the last child BPS that was created. In the example of FIG. 3, this field for per-BPS data structure 172a may point to BPS 170c.

Parent BPS Link 430: A pointer to the parent BPS in that Family. In some examples, only the oldest child has a populated parent BPS Link. In addition, parent BPSs may themselves have populated Parent BPS fields, e.g., when such Parent BPSs are also children of other Parent BPSs. In the example of FIG. 3, this field for per-BPS data structure 172b points to BPS 170a.

Forward Sibling BPS Link 440: A pointer to a next sibling BPS in the doubly-linked list. In the example of FIG. 3, this field for per-BPS data structure 172c points to BPS 170b.

Backward Sibling BPS Link 450: A pointer to a previous BPS in the doubly-linked list. In the example of FIG. 3, this field for per-BPS data structure 172*b* points to BPS 170*c*.

It is understood that the per-BPS data structure 172 may be implemented in a variety of ways. The example shown is intended to be merely illustrative.

Figure 5:
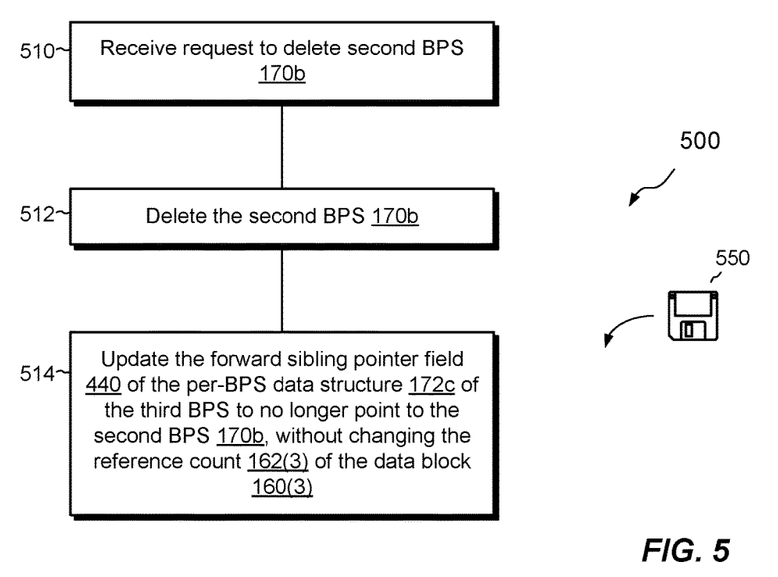
FIG. 5 is a flowchart showing an example process for deleting a child BPS.
Figure 6:
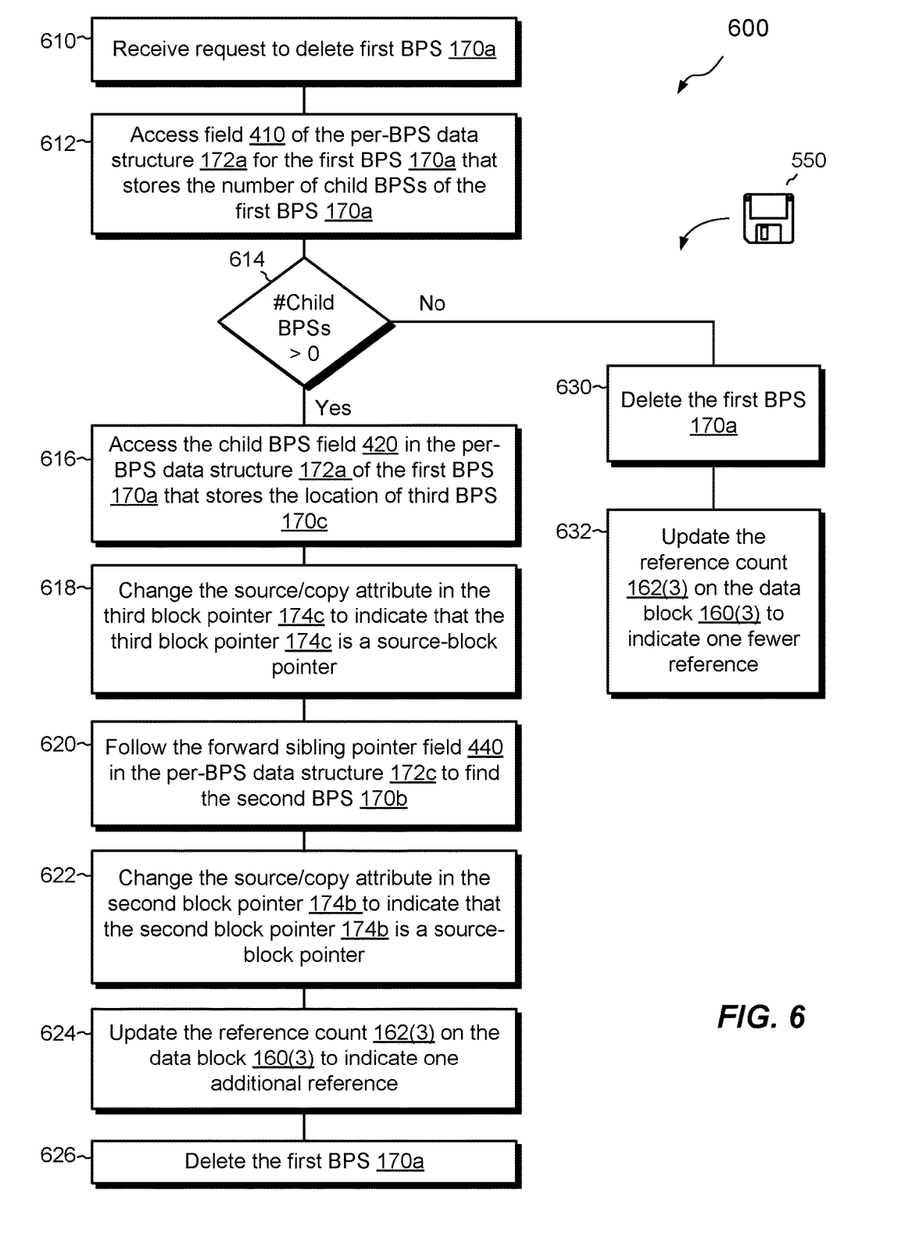
FIG. 6 is a flowchart showing an example process for deleting a parent BPS.

FIGS. 5 and 6 show example processes 500 and 600 for deleting BPSs. The processes 500 and 600 may be carried out by the file system 150, e.g., by executable instructions stored in the memory 130 and executed by the set of processing units 124.

FIG. 5 shows an example process 500 for deleting a child BPS, such as BPS 170*b*. Deletion of BPS 170*b* may accompany deletion of an entire file or a portion of a file, for example. At 510, a request is received to delete a child BPS, e.g., BPS 170*b*. The request may originate from another part of the file system 150, from another part of the data storage system 116, or from an IO request 112, for example. At 512, the BPS 170*b* is deleted. At 514, the per-BPS data structures are adjusted to account for the deletion. For instance, the file system 150 updates the forward sibling pointer field 440 in per-BPS data structure 172*c* to no longer point to the second BPS 170*b*. Deletion of BPS 170*b* has no effect on the reference count 162(3), as pointer 176*b* was a copy and not a source. However, the file system 150 does decrement reference count 162(10), as block pointer 174*b* was a source. Additional actions may accompany deleting a source-block pointer, as described below. For transactional consistency, step 512 may alternatively be performed after step 514, rather than before.

FIG. 6 shows an example process 600 for deleting a parent BPS, such as BPS 170*a*. At 610, a request is received to delete a parent BPS, such as BPS 170*a*. Prior to deleting a parent BPS, the file system 150 checks for children. At 612, the file system 150 checks field 410 of per-BPS data structure 172*a* for the parent BPS 170*a* to determine the number of child BPSs of parent BPS 170*a*. If no children are found, i.e., at decision 614, then BPS 170*a* is simply deleted (step 630) and the reference count 162(3) is decremented by one (step 632), to reflect one fewer source.

This is not the situation in the arrangement of FIG. 3, however, where BPS 170*a* has two child BPSs. If decision 614 finds children of BPS 170*a*, then the file system 150 looks to the head of the doubly-linked list (step 616) and finds the third BPS 170*c*, i.e., the child BPS at the head of the linked list.

At 618, the file system 150 finds any copy-block pointer in 170*c* of any source-block pointer in BPS 170*a* and promotes the copy-block-pointer to a source. For example, the file system 150 changes the S/C status of copy-block-pointer 176*c* to promote 176*c* to a source. If BPS 170*a* has any other source-block pointers (e.g., 174*a*), the file system 150 makes similar changes to any copy in BPS 170*c* to promote them to sources. No copies of block pointer 174*a* are shown.

At 620, the file system 150 follows the doubly-linked list to each of the other child BPSs (e.g., 170*b*) and performs similar operations, e.g., to promote copies of source-block pointers in 170*a* to source-block pointers. For example, the file system 150 promotes copy-block pointer 176*b* to a source (step 622). As in step 618, if BPS 170*a* has any other source-block pointers (not shown), the file system 150 makes similar changes on any copy in BPS 170*b* to promote them to sources.

As the file system 150 has promoted multiple copy-block pointers pointing to block 160(3) to source-block pointers, the file system increases the reference count 162(3) on block 160(3) by one to indicate one additional source (plus two for the two promoted copies minus one for the deleted source) (step 624). The file system 150 may similarly update reference counts to reflect the balance of copy-block pointers promoted minus source-block pointers deleted for other source-block pointers in BPS 170*a*, if there are any. For example, the file system 150 may decrement reference count 162(2) (there are no copies to promote, so the reference count is simply decremented by one). At 626, the file system deletes the parent BPS 170*a*. If the reference count on any data block goes to zero, the file system 150 may free the data block, i.e., to allow the data block to be used elsewhere.

It should be noted that an alternative to promoting every copy-block pointer of a deleted source-block pointer is to make one copy-block pointer the new source and to make any other copy-block pointers copies of that source. That solution is believed to be more complex, however.

Although not shown in FIG. 6, it should be understood that the file system 150 may also consult the U/P field of block pointers in the parent BPS 170*a* during the deletion process. For example, if a source-block pointer in BPS 170*a* has a private U/P status, then there is no need to search for children and the deletion process is accelerated. However, if a source-block pointer in BPS 170*a* has an unknown U/P status, then the file system 150 must search for children as part of the deletion process.

Also, it should be understood that parent BPS 170*a* may itself be a child BPS to another parent BPS. Thus, in addition to performing the acts shown in FIG. 6, the file system 150 may further check the parent BPS field 430 of the per-BPS data structure 172 of parent BPS 170*a* and follow the acts shown in FIG. 5 for deleting a child BPS.

Figure 7:
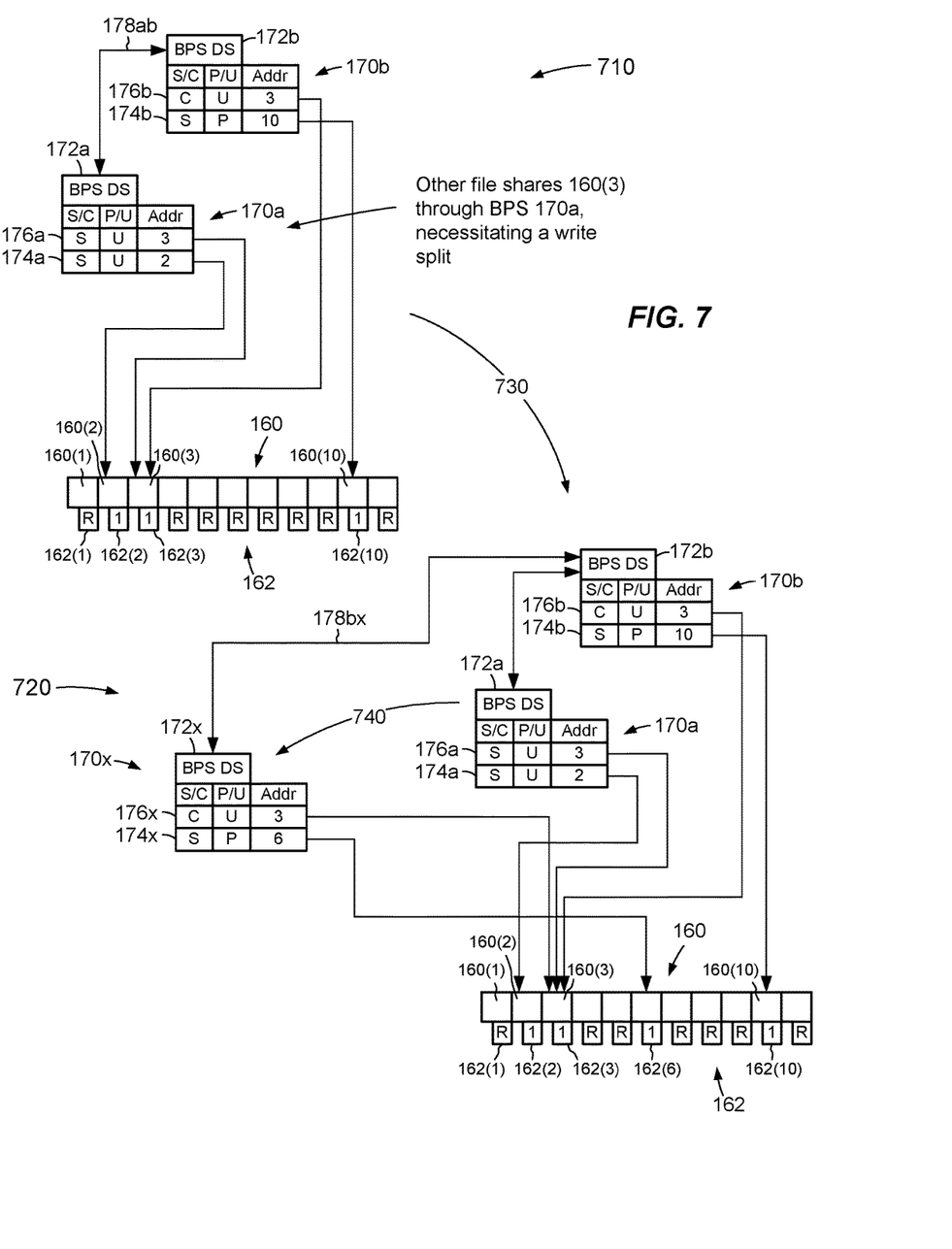
FIG. 7 is a block diagram showing an example process for performing a write split on a set of blocks pointed to by the first BPS.

FIG. 7 shows example activities that accompany performance of a write split. Here, as seen in view 710, the first and second BPSs 170*a* and 170*b* appear as they do in FIG. 1; no third BPS 170*c* is present. It is assumed for this example that multiple files share block 160(3) through BPS 170*a*. For example, the IDB 210 (FIG. 2) may be shared among IDB trees of multiple files. If one of those files attempts to change the data in block 160(2), a write split ensues, with changes indicated by arrow 730.

Here, as shown in view 720, the file system 150 creates a new BPS 170*x* as a child BPS of parent BPS 170*a*. For example, BPS 170*a* resides in IDB 210 (FIG. 2) and operation 740 allocates a new IDB and copies IDB 210 into the new IDB, bringing the contents of BPS 170*a* along with it.

In an example, the file system 150 identifies a first set of block pointers in BPS 170*a* that will no longer be shared with the new BPS 170*x* after the write split occurs, but rather will be made to point to newly allocated blocks. Here, the only pointer that will no longer be shared is pointer 174*a*. The file system 150 also identifies a second set of block pointers that will continue to be shared after the write split occurs. Here, the only pointer that will continue to be shared is pointer 176*a*. BPS 170*a* is shown with only two block pointers, but one can readily see that if BPS 170*a* were to include additional block pointers, then creating BPS 170*x* would entail changing some block pointers to point to newly allocated blocks while keeping other the same.

When creating the new BPS 170*x*, block pointers to newly allocated blocks (i.e., in the first set of block pointers) become private sources and point to newly allocated blocks. For instance, pointer 174*x* becomes a source that points to block 160(6). Block 160(6) assumes a reference count 162(6) of one. But copied block pointers from the second set of block pointers continue to point to the same blocks as in BPS 170*a*, and those copied pointers receive copy status. For instance, block pointer 176*x* is a copy of block pointer 176*a* and receives copy status.

In creating BPS 170*x*, the file system 150 further establishes link 178*bx* between per-BPS data structures 172*b* and 172*x*, i.e., to maintain sharing relationships within the family.

It should be noted that the reference count 162(3) of block 160(3) does not change as a result of the write split operation, as the addition of copy-block pointer 176*x* does not change the number of sources. Rather, sharing information is retained within the per-BPS data structures 172*a*, 172*b*, and 172*x*.

Figure 8:
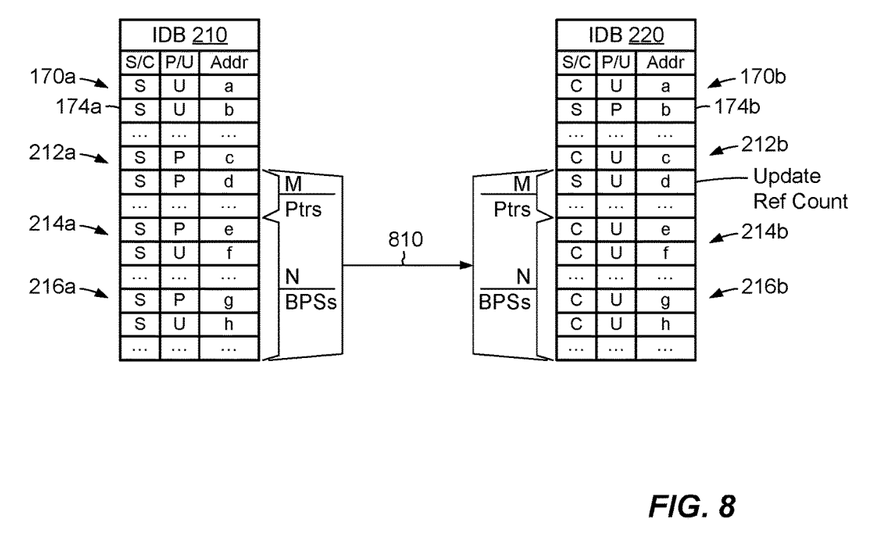
FIG. 8 is a diagram showing an example process for performing a fast copy or fast move from a first IDB to a second IDB.

FIG. 8 shows an example arrangement for performing a fast copy operation 810 between IDBs. Here, for example, the file system 150 receives a request to perform a logical copy of block pointers represented by N BPSs, shown as BPSs 214*a* and 216*a* (FIG. 2), as well as M individual block pointers, which are part of BPS 212*a*. The copy is requested to be performed from IDB 210 to corresponding locations in IDB 220. It should be understood, though, that copy-to location need not necessarily be directed to the same logical address range in IDB 220 as is represented by the pointers in IDB 210. The arrangement shown is merely an example.

To effect the fast copy operation 810, the file system 150 may, in any order, copy block pointers from the N BPSs in IDB 210 to corresponding locations in IDB 220. Each copied block pointer points to the same address in IDB 220 as it does in IDB 210, but its S/C status is set to copy in IDB 220. In addition, the N copies of BPSs are joined, by per-BPS data structures 172, with respective per-BPS data structures of the N BPSs in IDB 210. Thus, for example, the BPSs 214*b* and 216*b* may become child BPSs of 214*a* and 216*a*, respectively. No reference counts are updated as a result of copying the N BPSs.

Regarding the M pointers, however, maintaining family relationships with the M pointers in IDB 220 would require effectively splitting BPS 212*a*. Rather than performing processing to effect that end, the file system 150 instead copies the M block pointers to corresponding locations in IDB 220 and gives the copied block pointers (or pointer) source status. Any such copied block pointers are thus made sources, and the reference counts on the data blocks they point to are each incremented by one to reflect the one additional source. Thus, for example, copies of entire BPSs effect no changes in reference counts, whereas copies of portions of BPSs do.

Figure 9:
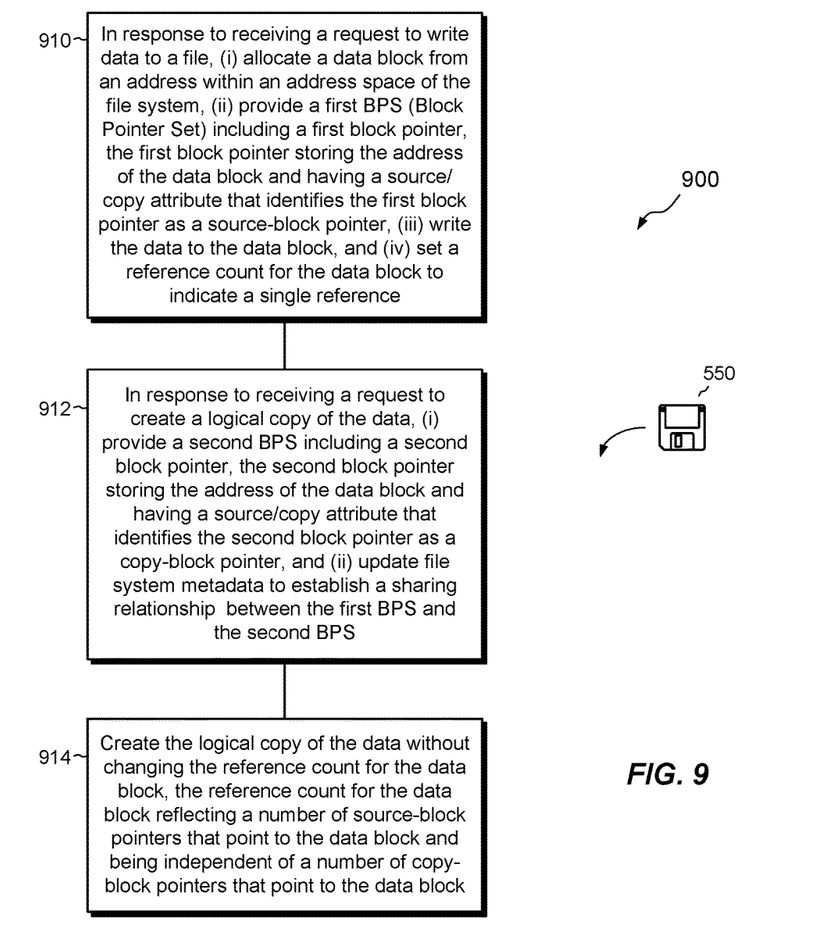
FIG. 9 is a flowchart showing an example process for managing storage in a file system that supports block sharing.

FIG. 9 shows an example process 900 for managing data storage in a file system that supports block sharing and provides a summary of some of the operations described above. The process 900 may be carried out by the file system 150, e.g., by executable instructions stored in the memory 130 and executed by the set of processing units 124.

At 910, in response to receiving a request to write data to a file, the following acts may be performed:
  (i) allocate a data block from an address within an address space of the file system,
  (ii) provide a first BPS (Block Pointer Set) including a first block pointer, the first block pointer storing the address of the data block and having a source/copy attribute that identifies the first block pointer as a source-block pointer,
  (iii) write the data to the data block, and
  (iv) set a reference count for the data block to indicate a single reference.

For example, the file system 150 may allocate a data block 160(3) from an FSBN, e.g., 3 (FIG. 1). The file system may provide a first BPS 170*a*, including block pointer 176*a*, which stores an address of block 160(3) and has an S/C attribute that identifies block pointer 176*a* as a source-block pointer. The file system 150 may write data to the data block 160(3) and set a reference count 162(3) to one.

At 912, in response to receiving a request to create a logical copy of the data, the following acts are performed:
  (i) provide a second BPS including a second block pointer, the second block pointer storing the address of the data block and having a source/copy attribute that identifies the second block pointer as a copy-block pointer, and
  (ii) update file system metadata to establish a sharing relationship between the first BPS and the second BPS.

For example, the file system 150 may provide BPS 170*b*, which includes block pointer 176*b*, which also stores the address of block 160(3) but has an S/C attribute that identifies block pointer 176*b* as a copy-block pointer. The file system 150 updates file system metadata, e.g., per-BPS data structures 172*a* and 172*b*, to indicate a sharing relationship between BPS 170*a* and BPS 170*b*.

At 914, the logical copy of the data is created without changing the reference count for the data block, the reference count for the data block reflecting a number of source-block pointers that point to the data block and being independent of a number of copy-block pointers that point to the data block. For example, creating the logical copy of the data does not change reference count 160(3), which reflects only the number of source-block pointers and does not count the number of copy-block pointers.

An improved technique has been described for managing file systems that support block sharing. The improved technique places a source/copy attribute in each block pointer. The source/copy attribute identifies the respective block pointer as either a source-block pointer or a copy-block pointer. A reference count on each data block maintains a count of the number of source-block pointers pointing to the data block but excludes the number of copy-block pointers pointing to the data block. Block pointers are arranged in block pointer sets (BPSs), and sharing relationships are formed among BPSs and copies of BPSs. The sharing relationships generally keep most block sharing information at the BPS level, with reference counts on data blocks tracking only the number of source-block pointers, which is typically small, often being equal to one. The improved technique avoids the need to change reference counts when adding copies of block pointers or deleting them, and thus promotes file system efficiency.

Having described certain embodiments, numerous alternative embodiments or variations can be made. For example, although it has been shown and described that the S/C and U/P attributes can combine to indicate SP (source, private), SU (source, unknown), and CU (copy, unknown) conditions, one could employ a fourth possible state for the purpose of designating a source, unknown with siblings (e.g., SUS). The fourth state would enable one to differentiate between sources that may have CU status on its siblings from ones that do not, thus avoiding the need to scan for siblings in certain common operations.

Also, although the illustrated embodiments pertain to tracking references for data blocks, the same or similar techniques may also be applied for tracking references to indirect blocks (IDBs). For instance, each IDB may have a reference count. Pointers to IDBs, e.g., from higher-level IDBs in an IDB tree, may be designated with source/copy attributes and, in some examples, with U/P attributes. Pointers to IDBs may be arranged in BPSs, with sharing relationships maintained by per-BPS data structures. Reference counts on IDBs reflect the number of source-block pointers to each IDB, and are independent of the number of copy-block pointers to each IDB. Write splits, fast copies, and deletions may be handled in the same manner as described above for data blocks.

In addition, a consequence of maintaining sharing relationships among per-BPS data structures 172 is that block sharing information may be located at each level of block pointers, potentially from inodes all the way down to the leaf IDBs, thus providing block sharing information at multiple levels of granularity. Data storage systems can leverage this block sharing information effectively to create snaps and clones of portions of files, rather than being limited to having to take snaps and clones of entire files.

Further, although embodiments have been described in connection with data storage systems, it should be understood that these are merely examples and that the invention hereof can be practiced on any computerized apparatus capable of running a file system.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 550 in FIGS. 5, 6, and 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments. In addition, unless a statement is made herein to the contrary, acts recited in the appended claims may be performed in any logical order.

Those skilled in the art will therefore understand that various changes in form and detail may be made to the embodiments disclosed herein without departing from the scope of the invention.

What is claimed is:

1. A method of managing data storage in a file system that supports block sharing, the method comprising:
   in response to receiving a request to write data to a file, (i) allocating a data block from an address within an address space of the file system, (ii) providing a first BPS (Block Pointer Set) including a first block pointer, the first block pointer storing the address of the data block and having a source/copy attribute that identifies the first block pointer as a source-block pointer, (iii) writing the data to the data block, and (iv) setting a reference count for the data block to indicate a single reference; and
   in response to receiving a request to create a logical copy of the data, (i) providing a second BPS including a second block pointer, the second block pointer storing the address of the data block and having a source/copy attribute that identifies the second block pointer as a copy-block pointer, and (ii) updating file system metadata to establish a sharing relationship between the first BPS and the second BPS,
   wherein creating the logical copy of the data does not accompany a change in the reference count for the data block, the reference count for the data block reflecting a number of source-block pointers that point to the data block and being independent of a number of copy-block pointers that point to the data block.

2. The method of claim 1, wherein the first BPS and the second BPS each include a same number of block pointers greater than one, the block pointers of the first BPS including the first block pointer and the block pointers of the second BPS including the second block pointer, the block pointers of the first BPS and the block pointers of the second BPS stored in a set of indirect blocks of the file system, each indirect block mapping a set of logical addresses of a file to corresponding set of physical addresses in the file system.

3. The method of claim 2, further comprising, in response to receiving a second request to create a second logical copy of the data, (i) providing a third BPS including the same number of block pointers as the first BPS and the second BPS, the third BPS including a third block pointer, the third block pointer storing the address of the data block and having a source/copy attribute that identifies the third block pointer as a copy-block pointer, and (ii) updating the file system metadata to establish a sharing relationship among the first BPS, the second BPS, and the third BPS, wherein creating the second logical copy of the data does not accompany a change in the reference count for the data block.

4. The method of claim 3, wherein the file system metadata includes a per-BPS data structure for each BPS, and wherein updating the file system metadata in response to the second request includes:
   for the per-BPS data structure for the first BPS, (i) updating a field storing a number of child BPSs of the first BPS to reflect that the block pointers in the first BPS were copied two times to other BPSs and (ii) updating a field storing a location of a child BPS to point to one of the second BPS and the third BPS;

for the per-BPS data structure for the second BPS, updating a first sibling pointer field to point to the third BPS; and for the per-BPS data structure for the third BPS, (i) updating a second sibling pointer field to point to the second BPS and (ii) updating a parent BPS field to point to the first BPS.

5. The method of claim 4, further comprising, in response to a request to delete the second BPS:
(i) deleting the second BPS and (ii) updating the second sibling pointer field of the per-BPS data structure of the third BPS to no longer point to the second BPS, wherein deleting the second BPS does not accompany a change in the reference count of the data block.

6. The method of claim 4, further comprising, in response to a request to delete the first BPS:
accessing the field of the per-BPS data structure for the first BPS that stores the number of child BPSs of the first BPS; and
in response to the number of child BPSs indicating a number greater than zero, (i) changing the source/copy attributes in the second and third block pointers to indicate that the second and third block pointers are each source-block pointers, (ii) updating the reference count on the data block to indicate one additional reference, and (iii) deleting the first BPS.

7. The method of claim 6, wherein changing the source/copy attributes in the second and third block pointers includes (i) accessing the field in the per-BPS data structure of the first BPS that stores the location of a child BPS, wherein the child BPS is the third BPS, (ii) changing the source/copy attribute in the third block pointer to indicate that the third block pointer is a source-block pointer, (iii) following the second sibling pointer field in the per-BPS data structure of the third BPS to find the second BPS, and (iv) changing the source/copy attribute in the second block pointer to indicate that the second block pointer is a source-block pointer.

8. The method of claim 2, further comprising, in response to a request to perform a write operation on a set of data blocks pointed-to by the first BPS,
identifying (a) a first set of block pointers in the first BPS pointing to a set of currently shared data blocks that will not continue to be shared after performing the write operation and (b) a second set of block pointers in the first BPS pointing to a set of currently shared data blocks that will continue to be shared after performing the write operation;
creating another BPS as a modified copy of the first BPS, the other BPS having modifications that (a) change each of the first set of block pointers to point to a respective newly allocated data block in the file system address space, (b) set the source/copy setting of each of the first set of block pointers to identify the block pointer as a source-block pointer, and (c) set the source/copy setting of each of the second set of block pointers to identify the block pointer as a copy-block pointer; and
setting a reference count of each data block pointed to by the first set of block pointers to indicate a single reference,
wherein writing to the set of shared data blocks in response to the request does not accompany changing a reference count of any data block pointed to by the second set of block pointers.

9. The method of claim 8, wherein the block pointers of the first BPS are stored in a first indirect block, and wherein creating the other BPS includes:
allocating a second indirect block; and
copying all of the block pointers of the first BPS from the first indirect block into the second indirect block.

10. The method of claim 9, further comprising, in response to a request to delete the other BPS, deleting the other BPS without updating reference counts on data blocks pointed to by any copy-block pointers in the other BPS.

11. The method of claim 2,
wherein each source-block pointer in the first BPS and the second BPS further includes a private/unknown attribute, wherein a private setting of the private/unknown attribute indicates that the respective source-block pointer has no child-block-pointers and wherein an unknown setting of the private/unknown attribute indicates that the respective source-block pointer either has at least one child-block-pointer or has no child-block-pointers, and
wherein, in response to a request to delete a source-block pointer having a private setting of its private/unknown attribute, the method further comprises deleting that source-block pointer without searching for child-block-pointers of that source-block pointer.

12. The method of claim 2, wherein the first BPS is one of a first set of BPSs stored in a first indirect block of the file system, wherein the second BPS is one of a second set of BPSs stored in a second indirect block of the file system, wherein the request to create the logical copy of the data is part of a larger request to logically copy data pointed to by N of the first set of BPSs into N of the second set of BPSs, and wherein the method further comprises, in response to the larger request,
copying all of the block pointers from the N BPSs of the first set of BPSs into corresponding locations of the N BPS of the second set of BPSs; and
setting the source/copy attribute of each of the copied block pointers in the second set of BPSs to indicate that the respective block pointer is a copy-block pointer.

13. The method of claim 2, wherein the first BPS is one of a first set of BPSs stored in a first indirect block of the file system, wherein the second BPS is one of a second set of BPSs stored in a second indirect block of the file system, wherein the request to create the logical copy of the data is part of a larger request to logically copy data pointed to by N of the first set of BPSs into N of the second set of BPSs and also to logically copy data pointed to by M block pointers in an N-plus-first BPS of the first set of BPSs into an N-plus-first BPS of the second set of BPSs, wherein the N-plus-first of the first set of BPSs includes greater than M block pointers, and wherein the method further comprises, in response to the larger request,
copying all of the block pointers from the N BPSs of the first set of BPSs into corresponding locations of the N BPS of the second set of BPSs;
copying all of the M block pointers from the N-plus-first BPS of the first set of BPSs into corresponding locations of the N-plus-first BPS of the second set of BPSs;
setting the source/copy attribute of each of the copied block pointers in the N BPSs in second set of BPSs to indicate that the respective copied block pointer is a copy-block pointer;
setting the source/copy attribute of each of the copied block pointers in the N-plus-first BPS in second set of BPSs to indicate that the respective copied block pointer is a source-block pointer; and increasing a reference count of each data block pointed to by the copied block pointers in the N-plus-first BPS to indicate one additional reference.

14. A data storage system, comprising a control circuitry that includes a set of processing units coupled to memory, the control circuitry constructed and arranged to:
  in response to receiving a request to write data to a file, (i) allocate a data block from an address within an address space of the file system, (ii) provide a first BPS (Block Pointer Set) including a first block pointer, the first block pointer storing the address of the data block and having a source/copy attribute that identifies the first block pointer as a source-block pointer, (iii) write the data to the data block, and (iv) set a reference count for the data block to indicate a single reference; and
  in response to receiving a request to create a logical copy of the data, (i) provide a second BPS including a second block pointer, the second block pointer storing the address of the data block and having a source/copy attribute that identifies the second block pointer as a copy-block pointer, and (ii) update file system metadata to establish a sharing relationship between the first BPS and the second BPS,
  wherein creating the logical copy of the data does not accompany a change in the reference count for the data block, the reference count for the data block reflecting a number of source-block pointers that point to the data block and being independent of a number of copy-block pointers that point to the data block.

15. The data storage system of claim 14, wherein the first BPS and the second BPS each include a same number of block pointers greater than one, the block pointers of the first BPS including the first block pointer and the block pointers of the second BPS including the second block pointer, the block pointers of the first BPS and the block pointers of the second BPS stored in a set of indirect blocks of the file system, each indirect block mapping a set of logical addresses of a file to corresponding set of physical addresses in the file system.

16. A computer-program product including a set of non-transitory, computer-readable media having instructions which, when executed by a set of processing units, cause the set of processing units to perform a method for managing data storage in a file system that supports block sharing, the method comprising:
  in response to receiving a request to write data to a file, (i) allocating a data block from an address within an address space of the file system, (ii) providing a first BPS (Block Pointer Set) including a first block pointer, the first block pointer storing the address of the data block and having a source/copy attribute that identifies the first block pointer as a source-block pointer, (iii) writing the data to the data block, and (iv) setting a reference count for the data block to indicate a single reference; and
  in response to receiving a request to create a logical copy of the data, (i) providing a second BPS including a second block pointer, the second block pointer storing the address of the data block and having a source/copy attribute that identifies the second block pointer as a copy-block pointer, and (ii) updating file system metadata to establish a sharing relationship between the first BPS and the second BPS,
  wherein creating the logical copy of the data does not accompany a change in the reference count for the data block, the reference count for the data block reflecting a number of source-block pointers that point to the data block and being independent of a number of copy-block pointers that point to the data block.

17. The computer program product of claim 16, wherein the first BPS and the second BPS each include a same number of block pointers greater than one, the block pointers of the first BPS including the first block pointer and the block pointers of the second BPS including the second block pointer, the block pointers of the first BPS and the block pointers of the second BPS stored in a set of indirect blocks of the file system, each indirect block mapping a set of logical addresses of a file to corresponding set of physical addresses in the file system.

18. The computer program product of claim 17, wherein the method further comprises, in response to a request to perform a write operation on a set of data blocks pointed-to by the first BPS,
  identifying (a) a first set of block pointers in the first BPS pointing to a set of currently shared data blocks that will not continue to be shared after performing the write operation and (b) a second set of block pointers in the first BPS pointing to a set of currently shared data blocks that will continue to be shared after performing the write operation;
  creating another BPS as a modified copy of the first BPS, the other BPS having modifications that (a) change each of the first set of block pointers to point to a respective newly allocated data block in the file system address space, (b) set the source/copy setting of each of the first set of block pointers to identify the block pointer as a source-block pointer, and (c) set the source/copy setting of each of the second set of block pointers to identify the block pointer as a copy-block pointer; and
  setting a reference count of each data block pointed to by the first set of block pointers to indicate a single reference,
  wherein writing to the set of shared data blocks in response to the request does not accompany changing a reference count of any data block pointed to by the second set of block pointers.

19. The computer program product of claim 17,
  wherein each source-block pointer in the first BPS and the second BPS further includes a private/unknown attribute, wherein a private setting of the private/unknown attribute indicates that the respective source-block pointer has no child-block-pointers and wherein an unknown setting of the private/unknown attribute indicates that the respective source-block pointer either has at least one child-block-pointer or has no child-block-pointers, and
  wherein, in response to a request to delete a source-block pointer having a private setting of its private/unknown attribute, the method further comprises deleting that source-block pointer without searching for child-block-pointers of that source-block pointer.

20. The computer program product of claim 19, wherein the first BPS is one of a first set of BPSs stored in a first indirect block of the file system, wherein the second BPS is one of a second set of BPSs stored in a second indirect block of the file system, wherein the request to create the logical copy of the data is part of a larger request to logically copy data pointed to by N of the first set of BPSs into N of the second set of BPSs and also to logically copy data pointed to by M block pointers in an N-plus-first BPS of the first set of BPSs into an N-plus-first BPS of the second set of BPSs, wherein the N-plus-first of the first set of BPSs includes greater than M block pointers, and wherein the method further comprises, in response to the larger request,
  copying all of the block pointers from the N BPSs of the first set of BPSs into corresponding locations of the N BPS of the second set of BPSs;
  copying all of the M block pointers from the N-plus-first BPS of the first set of BPSs into corresponding locations of the N-plus-first BPS of the second set of BPSs;
  setting the source/copy attribute of each of the copied block pointers in the N BPSs in second set of BPSs to indicate that the respective copied block pointer is a copy-block pointer; and
  setting the source/copy attribute of each of the copied block pointers in the N-plus-first BPS in second set of BPSs to indicate that the respective copied block pointer is a source-block pointer; and
  increasing a reference count of each data block pointed to by the copied block pointers in the N-plus-first BPS to indicate one additional reference.

* * * * *